United States Patent
Camirand et al.

[11] Patent Number: 6,125,895
[45] Date of Patent: Oct. 3, 2000

[54] MODULAR DELIMBER

[75] Inventors: Martin Camirand, St-Hyacinthe; Bertrand Jeanson, St-Bernard; Alain Bellefeuille, Drummondville, all of Canada

[73] Assignee: Denharco Inc., Saint-Hyacintre, Canada

[21] Appl. No.: 09/360,790

[22] Filed: Jul. 26, 1999

[51] Int. Cl.[7] .................................................. A01G 23/095
[52] U.S. Cl. ........................ 144/24.13; 144/338; 144/343
[58] Field of Search .................................. 144/4.1, 24.13, 144/335, 336, 337, 343, 338; 414/686, 718; 212/294, 299

[56] References Cited

U.S. PATENT DOCUMENTS

| | | |
|---|---|---|
| 3,642,041 | 2/1972 | Hamilton et al. . |
| 4,226,270 | 10/1980 | Sturtz, Jr. . |
| 4,276,918 | 7/1981 | Sigouin . |
| 4,289,177 | 9/1981 | Hammond et al. .................. 144/24.13 |
| 4,428,407 | 1/1984 | Bourbeau . |
| 4,735,049 | 4/1988 | Ketonen . |
| 4,919,175 | 4/1990 | Samson . |

*Primary Examiner*—W. Donald Bray

[57] ABSTRACT

A delimber having a standard carriage and a delimbing boom, the delimbing boom slidably mounted through the carriage. A drive module is detachably connected to the carriage for use in moving the boom relative to the carriage. Two different types of booms and up to three different drive modules, each with a different drive, can be provided. The boom and module selected to give the operating characteristics desired by the operator are connected to the carriage. Drive transfer members, in the form of cable or chain drives, are connected between the selected drive module and the selected boom. The module carries a variable displacement hydraulic motor. The motor is connected by a gear box to the drive transfer member. The variable displacement motor can be used on a delimber that does not employ a detachable drive module. On delimbers using cable drives, at least one end of each cable is connected to the delimber with a hydraulic tensioner.

8 Claims, 4 Drawing Sheets

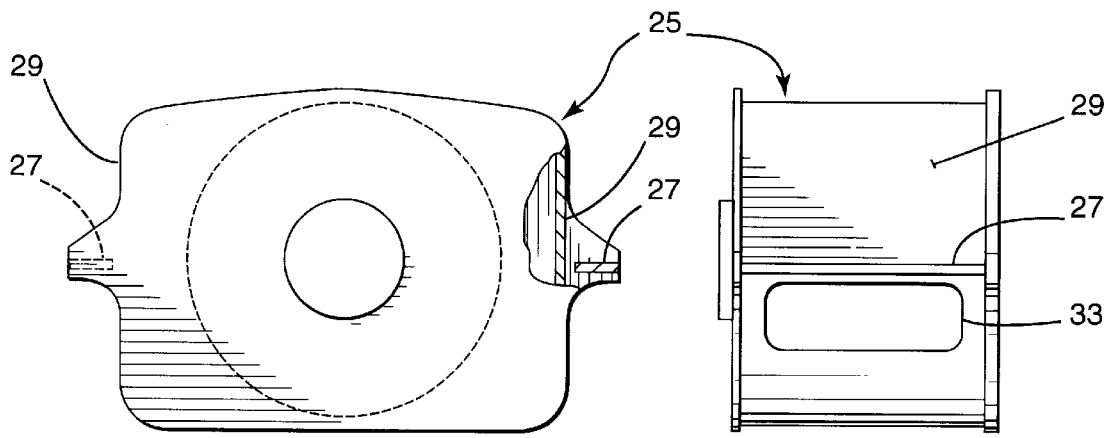
Fig. 3  Fig. 4
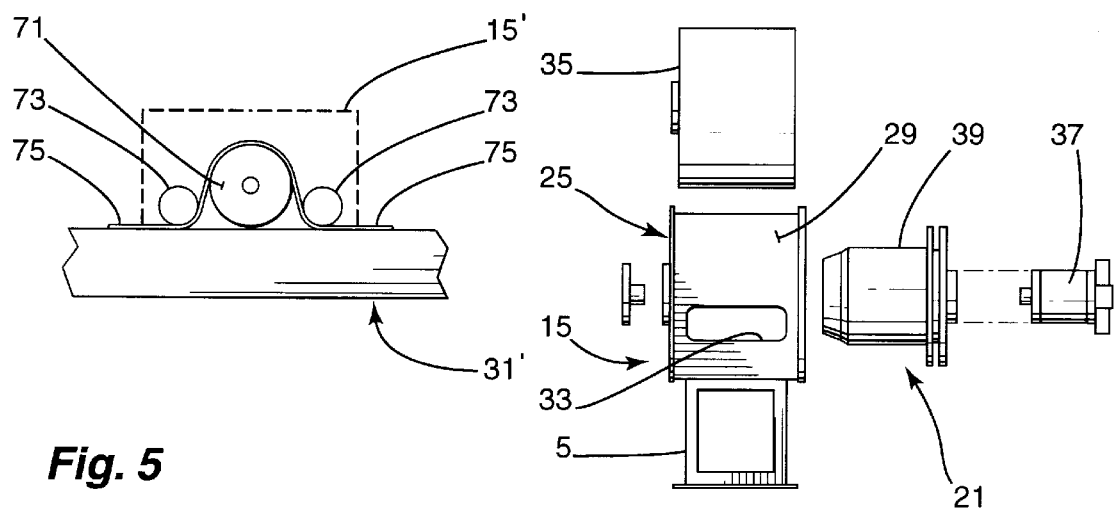
Fig. 5  Fig. 2

MODULAR DELIMBER

FIELD OF THE INVENTION

This invention is directed toward an improved tree delimber.

The invention is more particularly directed toward an improved delimber that is, in part, of modular construction so that the delimber can be constructed with one of several different boom drive means and one of two types of booms depending on the requirements of the delimber operator. The invention is also directed toward an improved delimber having the boom drive means operated by a variable displacement hydraulic motor to improve the range of operation of the delimber. The invention is further directed toward an improved delimber having improved cable boom drive means with hydraulic tensioning means for the cable or cables employed in the drive means.

BACKGROUND ART

Delimbers presently are constructed in several different versions. Some delimbers have cable drives for driving the delimbing boom and some have chain drives. Some delimbers employ a single section or mono boom and others employ a multi-section or telescopic boom. Because of the different versions of delimbers used, it is expensive for a manufacturer to provide a full range of delimbers and many do not.

Delimbers are also presently constructed to employ a fixed displacement hydraulic motor to operate the cable or chain drives which move the boom. This arrangement is relatively simple and inexpensive. The hydraulic motor is sized to have the delimber able to handle the size of the tree to be normally harvested and is a compromise in the power required to lift the tree and the speed required to delimb it. Because of the compromised design, the delimber is slow in picking up and handling trees larger than the normal size to be delimbed. In efforts to increase the speed of operation of the delimber when handling large trees, the operator often increases the operating pressure of the hydraulic motor over its designed limit and this can lead to failure of the motor.

Delimbers that employ cable boom drive means sometimes fail due to stress. This is, in part, due to the fact that the cables are not long enough to handle the loading. The cables can also fail if they are not properly tensioned. The cables stretch during use and it is necessary to frequently stop operation of the delimber to properly retension the cables.

SUMMARY OF THE INVENTION

It is the purpose of the present invention to provide a delimber that is, in part, of modular construction so that different versions of a delimber may be more inexpensively manufactured. It is also a purpose of the present invention to provide a delimber which, due to its modular construction, is easier to repair.

It is another purpose of the present invention to provide improved boom drive means which allows the delimber to more easily handle and delimber larger than normal trees encountered in tree harvesting operations.

It is yet another purpose of the present invention to provide means for strengthening cable boom drive means in delimbers by employing longer cables. It is also a purpose of the present invention to provide means for quickly and easily tensioning cables employed in a cable boom drive means on a delimber without having to frequently halt operation of the delimber.

The present invention is directed toward a delimber of the type having a boom slidable through a carriage, the carriage having gripping means at the front end to hold the tree, the front end of the boom having a delimbing head to delimb the tree. While the tree is held by the gripping means on the carriage, the boom is moved forwardly relative to the carriage to have the delimbing head delimb the tree.

The improvements in the delimber of the above type, in one embodiment of the invention, are related to providing a basic delimber some components of which are interchangeable to provide variations of the basic delimber depending on the buyer's requirements. The basic delimber will have a standard base and a standard carriage fixed to the base. However the carriage will be able to mount either a mono boom or a telescopic boom depending on the buyer's requirements. The drive means for the boom, mounted on the carriage, can also be changed depending on the buyer's requirements. Thus many variations of the basic delimber can be easily manufactured.

The delimber has improved boom drive means in the form of a drive module detachably mounted on the carriage. Variations of the drive module are constructed depending on the type of drive desired for the boom. Drive modules for a single cable drive system; a double cable drive system; or a chain drive system can be provided. The buyer selects any one of the various drive modules, each of which fits in the same mounting area on the carriage. The manufacture simply installs the required module in the standard carriage when manufacturing the delimber. The selected drive module is easily replaced with the same type of module making servicing of the delimber simple and inexpensive.

In accordance with another embodiment of the invention, the delimber can be provided with a strengthened cable boom drive means. The strengthened cable drive means doubles back the drive cables using guide pulleys at the ends of a mono boom. This requires the use of longer cables. However, the use of longer cables allows the cable drive means to handle impact stresses better and thus increases the life of the drive means.

At least one of the ends of each cable employed in the cable boom drive means can be provided with a hydraulic tensioner for maintaining the cable tight.

In accordance with a further embodiment of the present invention, there is provided a variable displacement hydraulic motor for operating the boom drive means. The motor allows the delimber to both more quickly delimb trees and to more easily handle larger than normal trees. The variable displacement motor, when operating at low displacement, operates at high speed for fast delimbing. With the motor operating at a higher displacement, the motor has more torque and thus is able to more easily handle larger trees. Since variable displacement motors normally operate at higher speeds than fixed displacement motors, they are employed with a gear box to provide the normal speed of operation required of the delimber.

The invention is particularly directed toward a delimber having a base; a carriage mounted on the base; a boom slidably mounted through the carriage; a drive module detachably connected to the carriage; drive means in the drive module; and drive transfer means connected between the drive means and the boom for moving the boom relative to the carriage.

The invention is also particularly directed toward a delimber having a base, a carriage mounted on the base; a boom slidably mounted through the carriage; drive transfer means for moving the boom relative to the carriage; and a variable displacement hydraulic motor for operating the drive transfer means.

The invention is further directed toward a delimber having a base, a carriage mounted on the base; a boom slidably mounted through the carriage; cable drive means for moving the boom relative to the carriage; at least one end of each cable in the cable drive means connected to a hydraulic tensioner on the delimber. The invention is further directed toward a delimber having a base, a carriage mounted on the base; a mono boom slidably mounted through the carriage; cable drive means for moving the mono boom relative to the carriage; the cable drive means having at least one cable fixed at one end to the carriage, the cable passing over a pulley on each end of the mono boom and fixed at its other end to the carriage.

BRIEF DESCRIPTION OF THE DRAWINGS

FIG. 2 is an exploded view of the drive means in the drive module;

FIG. 3 is a side view of the drive module housing;

FIG. 4 is an end view of the drive module housing;

FIG. 5 is a detail side view of a chain drive employed in a drive module;

DESCRIPTION OF THE PREFERRED EMBODIMENTS OF THE INVENTION

Figure 1:
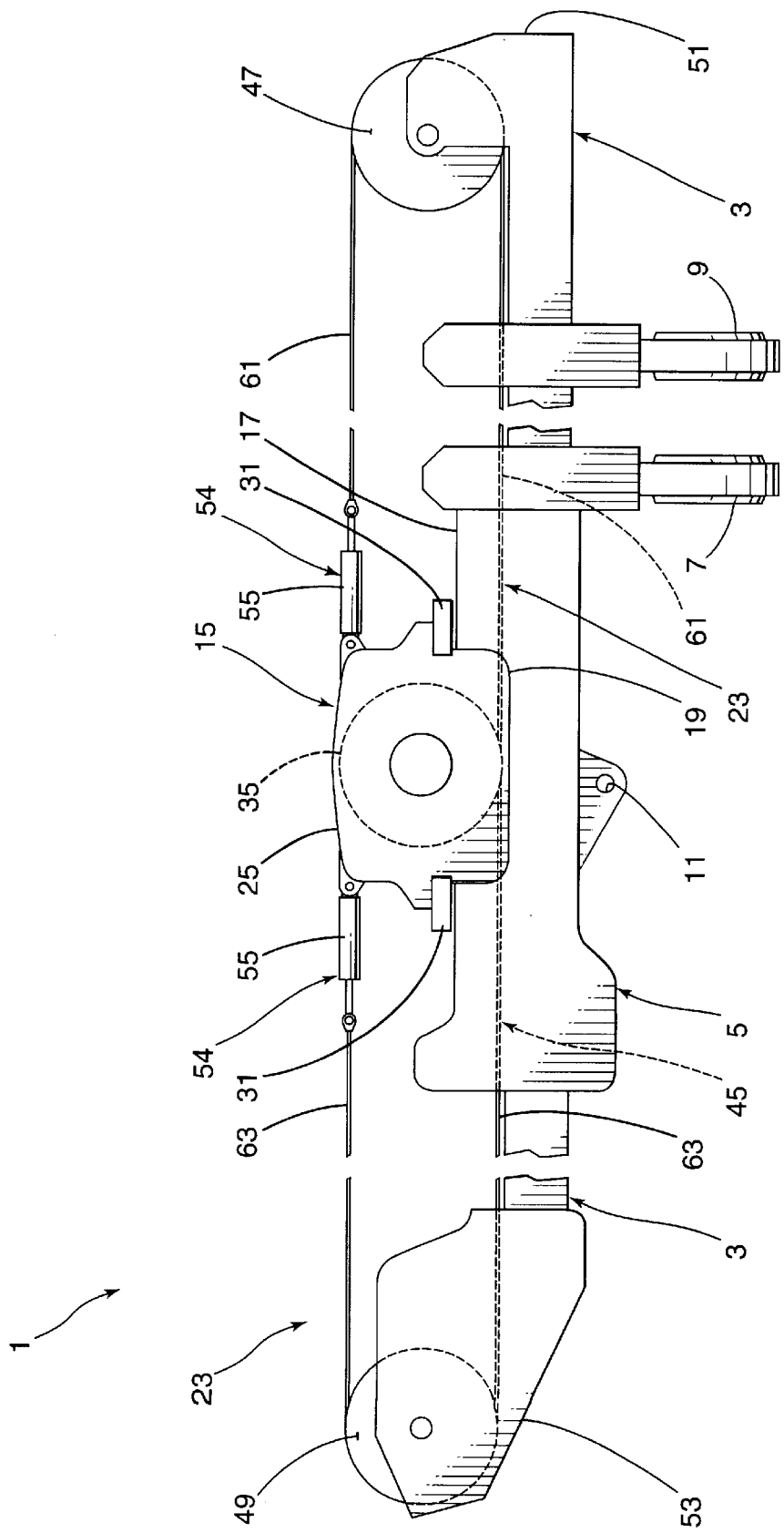
FIG. 1 is a side view of a delimber.

The delimber 1 as shown in FIGS. 1 and 2 has a single section or mono boom 3 mounted on a fixed carriage 5 which in turn is mounted on a tracked vehicle (not shown). The carriage 5 has tree gripping means 7 at its front end. The boom 3 carries tree gripping and delimbing means 9 close to its front end. The carriage 5 is mounted on the vehicle by pivot means 11 so it can be tilted downwardly to pick up a tree to be delimbed by the tree gripping means 9 on the boom 3. The boom 3 is moved to position the gripped tree in the tree gripping means 7 on the carriage 5. Once the end of the tree is gripped by the tree gripping means 7 on the carriage 5, the boom 3 is moved forwardly relative to the carriage 5 and the tree to delimb the held tree by the delimbing means 9.

The delimber 1 has a drive module 15 for use in driving the boom 3 that is detachably mounted on the top of the carriage 5. The top 17 of the carriage 5 has a shallow well 19 formed therein for snugly receiving the drive module 15 therein. The drive module 15 contains drive means 21 for moving the boom 3. Drive transfer means 23 are connected between the drive means 21 and the boom 3 for moving the boom 3 relative to the carriage 5. The drive module 15 has a housing 25 with flanges 27 on the end walls 29 of the housing 25, as shown in FIGS. 3 and 4, by means of which the module 15 is mounted on longitudinally spaced-apart supports 31 on top of the carriage 5. The supports 31 provide a solid mounting base for the module 15. Openings 33 are provided in the end walls 29 of the housing 25 beneath the flanges 27, through which drive transfer means 23 for the boom pass as will be described.

In one embodiment, the drive means 21 includes a winch drum 35 about which the drive transfer means 23, in the form of one or more cables, pass. The winch drum 35 is rotatably mounted in the housing 25, the axis of rotation of the drum 35 being transverse to the longitudinal axis of the boom 3. The winch drum 35 is driven by a hydraulic motor 37. A gear box 39, fixed to the housing 25, connects the motor 37 to the winch drum 35. The winch drum 35 is relatively large compared to winch drums on known cable drum drives. The larger drum reduces stress on the parts making it easier to take loads. It also helps minimize cavitation in the hydraulic motor 37. The gear box 39, employing a planetary gear drive, allows the hydraulic motor 37 to work more efficiently, providing high torque at low speed of the motor and low torque at high speed.

The drive transfer means 23 comprises a pair of cables 45, only one of which is shown. The cables 45 are parallel to each other and are wrapped about the winch drum 35. The cables 45 pass out of both end walls 29 of the housing 25 from the winch drum 35 through the openings 33 in the end walls 29. The cables 45 pass over front and rear guide pulleys 47, 49 located at the top of the boom 3 at its front and rear ends 51, 53. The ends of the cables 45 are connected to the housing 25 of the drive module 15 on the top, front and back by suitable connecting means 54. The connecting means 54 can comprise hydraulic tensioners 55 to retain the cables 45 properly tensioned as will be described.

Rotation of the winch drum 35 by the hydraulic motor 37 in a clockwise direction, as seen in FIG. 1, will wind the front cable length 61 up on the drum 35 thus moving the boom 3 rearwardly via front pulleys 47 while the rear cable length 63 unwinds from the drum 35. Rotating the drum 35 in the other, counterclockwise, direction will wind the rear cable length 63 up on the drum 35 thus moving the boom 3 forwardly via rear pulleys 49 while the front cable length 61 unwinds from the drum 35.

The use of the pulleys 47, 49 lengthens the cables 45 and thus minimizes the stress placed on the cables by sudden starts and stops of the boom, the longer cable being better able to absorb the impact. The hydraulic tensioners 55 ensure that the cables 45 remain taunt, increasing their life. Other connecting means can be employed. However, with the cables doubled back to increase their length, and being connected at their ends to the carriage 5, this arrangement allows better use of hydraulic tensioners since the machine hydraulics are located in the carriage 5 and long hydraulic lines to the tensioners are therefore not needed. While tensioners 55 are shown on both ends of the cables 45 they can be used on only end if desired.

While a double cable drive has been described, with the cables 45 doubled back about pulleys 47, 49 for connection to the carriage 5, the double cables 45 could instead be attached at their ends to the front and rear ends 51, 53 of the boom 3 instead of being doubled back over pulleys to the carriage. The drive means will not be able to withstand impact loads as effectively but can still operate satisfactorily. At least one of the connections to the front and rear ends 51, 53 would preferably employ a tensioner 55.

While a double cable drive has been shown, a single cable drive can be employed if desired. The single cable drive (not shown) is similar to the double cable drive and can be doubled back, if desired, over pulleys located at the top ends of the boom to connect to the carriage; or can be connected to the ends of the boom. The winch drum employed for the single cable drive is different from the winch drum employed for the double cable drive and thus a different drive module is employed for single cable drives from the drive module employed for double cable drives.

The single or double cable drives could be replaced by a chain drive if desired. A separate chain drive module is provided having a chain drive gear 71, driven by a hydraulic motor (not shown), mounted in the drive module housing 15' with guide gears 73 adjacent the drive gear 71, as shown in FIG. 5. Chain drives of this type are well known, the chain 75 being fastened to the top of the boom 3' at its ends with the chain 75 threaded under the guide gears 73 and over the drive gear 71. Rotation of the drive gear 71 in either direction, by the hydraulic motor, will move the boom 3' via the chain 75 in either direction.

Three different types of drive modules 15, 15' have been described, any one of which can be installed in the mounting well 19 on the top 17 of the carriage 5 of the delimber. If servicing of the installed module is required, the module can be easily replaced with an identical module.

Figure 6:
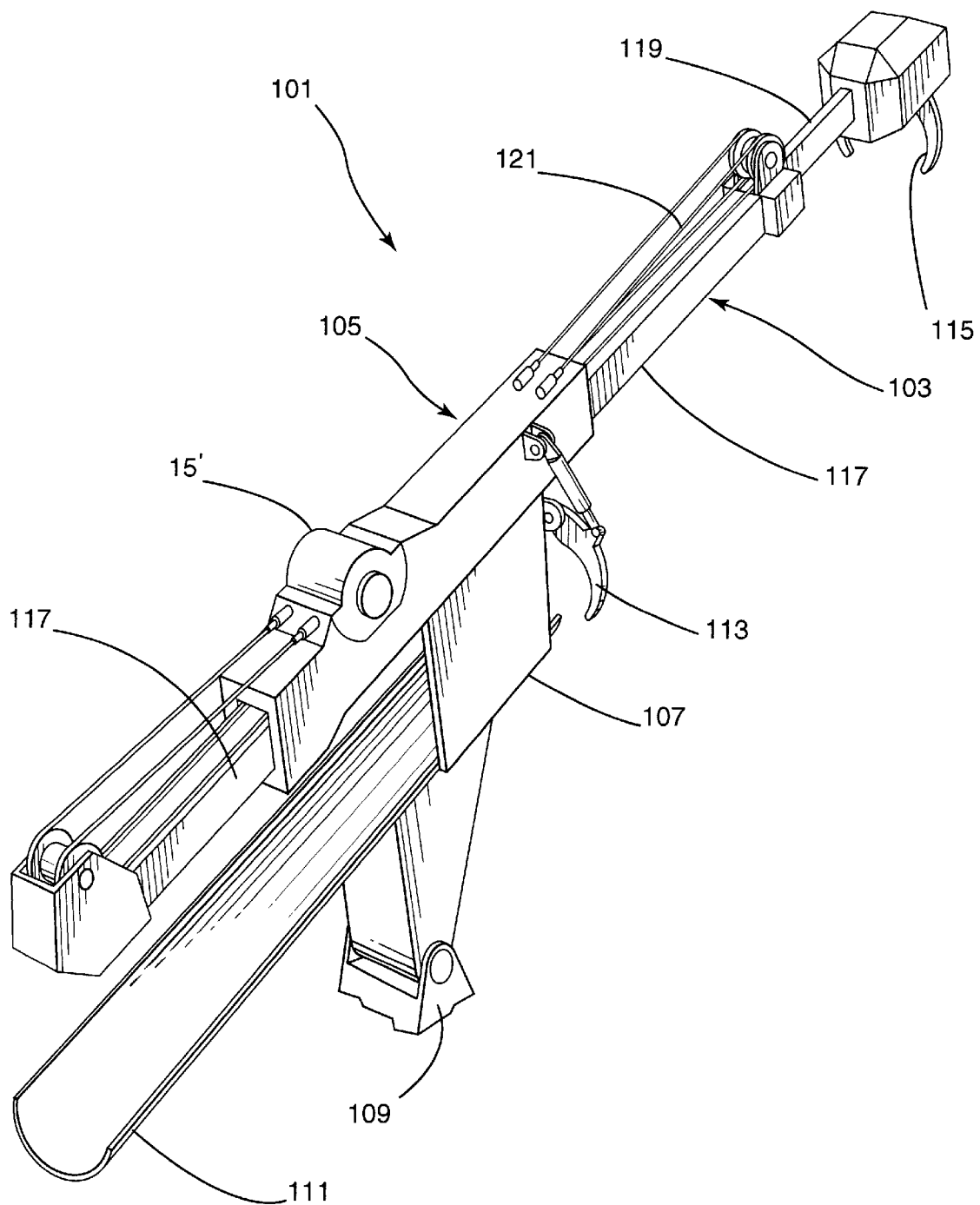
FIG. 6 is a perspective view of a delimber using a telescopic boom.

The delimber described above has been provided with a single section or mono boom. The delimber can also be provided with a multi-section or telescopic boom. As shown in FIG. 6, the delimber 101 has a telescopic boom 103 mounted in a carriage 105. the carriage 105 is mounted via a mounting 107 on a tracked vehicle 109. The mounting 107 carries a trough 111 under, and generally parallel to, the carriage 105 for receiving a tree to be delimbed. Tree gripping means 113 are mounted on the front of the carriage 105 and a tree delimbing head 113 is mounted on the front of the boom 103. Means are provided for tilting the mounting and thus the boom to pick up a tree for delimbing.

The telescopic boom 103 has an outer section 117 that is mounted for sliding movement through the carriage 105 and at least one inner section 119 mounted for sliding movement within the outer section 117. Suitable drive means are provided for automatically extending or retracting the inner boom section 119 relative to the outer boom section 117 as the outer boom section 117 is extended or retracted relative to the carriage 105. These drive means, between the boom sections 117 and 119, are well known.

Drive means (not shown) are provided in a drive module 15' detachably mounted in the carriage 105. The drive means, as previously described, can be provided for moving the outer boom section 117 relative to the carriage 105 via suitable drive transfer means such as a chain drive 121. The outer section 117 of the telescopic boom 103 has the same cross-sectional dimensions as the mono boom so that either boom can be used within the carriage depending on the client's requirements. Having the mono and telescopic booms made the same size and the same cross-sectional shape permits the different types of delimbers to be more easily manufactured, the carriage permitting either boom to be used. The use of the modular drive permits different drives to be used with the different booms.

The hydraulic motor 37 employed with the module is a variable displacement hydraulic motor. The hydraulic motor is connected to the winch drum through a gear box 39 mounted on the module. The motor is controlled through first and second pressure control valves to operate normally at a low pressure to provide low torque and high speed to move the boom the first pressure control valve causes the boom to move in one direction to delimb the tree while it is held and the second pressure control valve causes the boom to move in the opposite direction to move the tree. Since the motor is operating normally at a relatively high speed, the gear box is needed to reduce the output of the motor to provide the required speed of operation of the boom particularly in fast delimbing. If the delimber encounters a particularly heavy tree, the displacement of the motor can be changed to provide higher pressure and thus higher torque necessary to handle the heavier tree such as when lifting it into position. Preferably, the pressure is increased by having the operator connect a third pressure control valve in series with the pilot flow of the second control valve in the hydraulic circuit connected to the motor. The connection need only be for a short time, five seconds for example, to provide a short burst of power needed to handle the heavy tree. The operation of the motor will then revert to operation at the lower, normal operating pressure. The short power burst can be provided as many times as needed during the handling of the tree.

Figure 7:
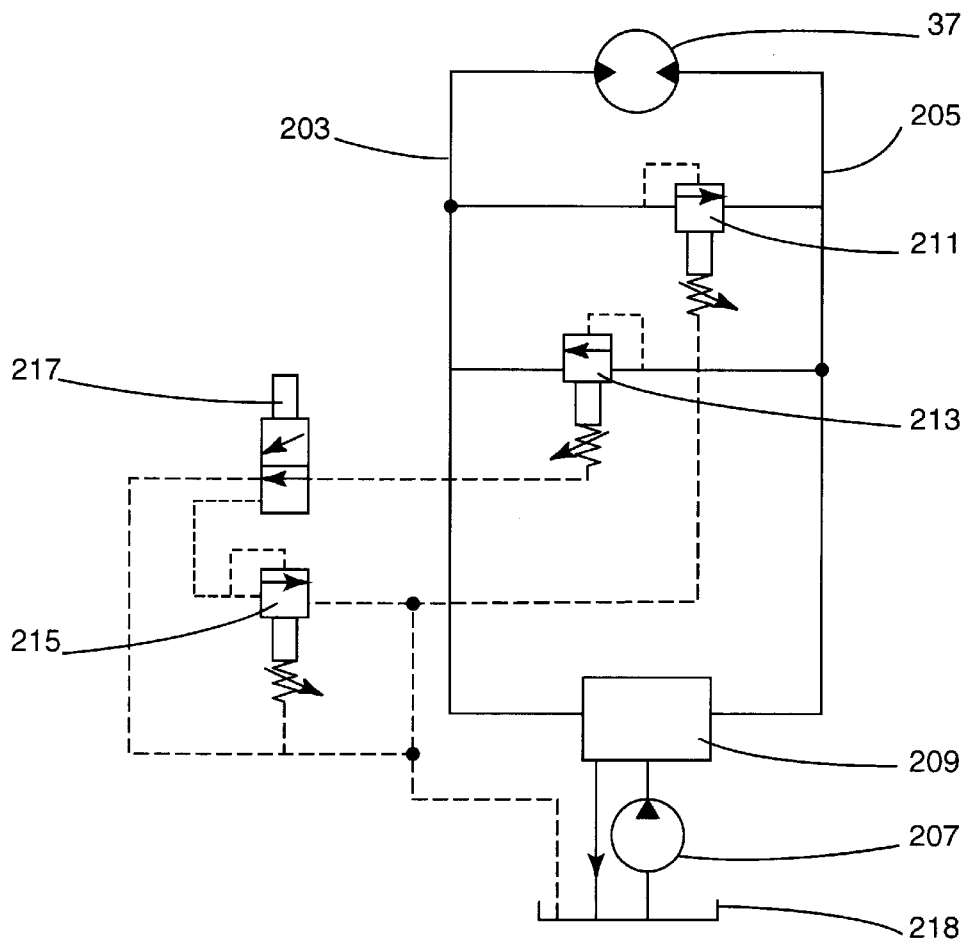
FIG. 7 is a schematic view of the hydraulic system for the variable displacement hydraulic motor.

In more detail, as shown in FIG. 7, the variable displacement hydraulic motor 37 has a first hydraulic line 203 leading to one side and a second hydraulic line 205 leading to the other side. In one mode of operation a hydraulic pump 207 on the vehicle carrying the delimber boom is connected by a selector valve 209 to the first line 203, acting as an input line, to drive the motor 37 in one direction which direction causes the boom to move outwardly in a delimbing operation. The second line 205, acting as a return line, is connected by the selector valve 209 to a hydraulic reservoir 210 associated with the pump 207. A first pressure control valve 211 is connected across the feed lines 203, 205. This first control valve 211 is set to control the motor 201 to operate at the desired normal operating pressure to have the delimber move out to delimb a tree. This pressure could be 3200 psi by way of example. In a second mode of operation, the selector valve 209 connects the pump 207 to the second line 205 acting as the input line to the motor 201 to drive the motor in the opposite direction. In this mode of operation, the boom is being withdrawn carrying a tree to be loaded to be delimbed.

A second pressure control valve 213 is also connected across the feed lines 203, 205. Line 203 is now the return line as determined by the selector valve 209. The second pressure control valve 213 is similar to the first control valve 211 and is set to control the motor 201 to operate at the desired maximum pressure to move a tree to be delimbed. This second control valve also operates at 3200 psi. If it is required that the motor operate at a higher pressure for a short time such as when handling a very large and heavy tree, the operating pressure of the hydraulic motor 37 can be increased, to 4200 psi by way of example. This can be done by having the drain from the second pressure control valve 213 routed through a third pressure control valve 215 which third valve 215 is in series with the pilot flow of the second valve 213 when a solenoid valve 217 is actuated. The third pressure control valve 215 is set to operate at 1000 psi. When the third control valve 215 is cut in by the solenoid valve 217, the operating pressure in the hydraulic motor 201 is increased by 1000 psi to 4200 psi to provide a power boost for a short period of time. This helps the delimber easily handle a heavier tree. The solenoid valve 217 is actuated by a button in the operator's cabin on the delimber. A timer (not shown) associated with the solenoid valve 217 will cut out the solenoid valve after a predetermined period of time, such as 5 secs. The power boost provided by the third control valve can range between 20% and 40% of normal operating pressure of the pump as determined by the first control valve.

The variable displacement hydraulic motor 37 described above could be used with either the single or double cable drives described or with the chain drive described. More importantly, the variable displacement hydraulic motor 37 could be used in other delimbers using cable or chain drives which other delimbers do not employ a detachable, replaceable, drive module. Any of these other delimbers could use mono or telescopic booms.

Figure 8:
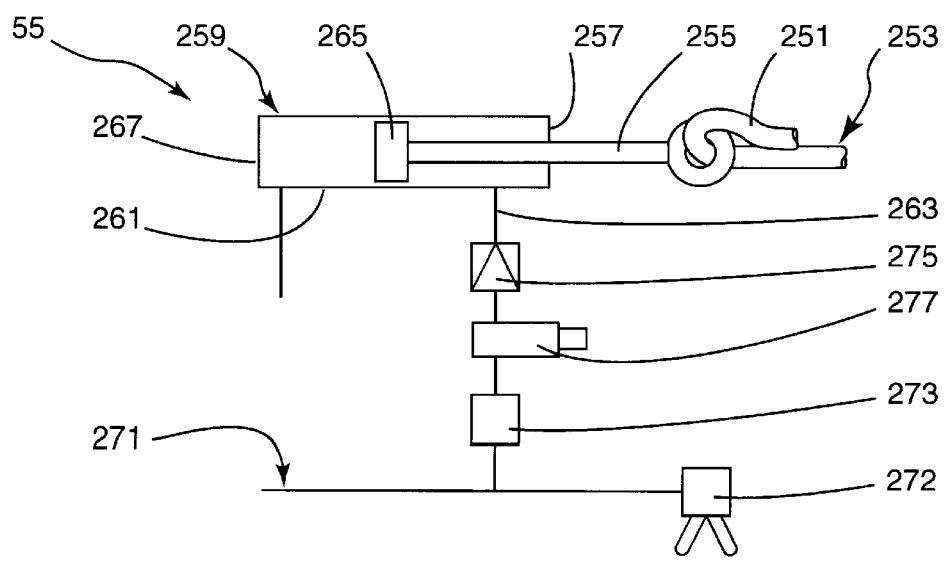
FIG. 8 is a schematic view of the hydraulic system employed by the hydraulic cable tensioner.

The hydraulic tensioner 55, as shown in FIG. 8, has at least one end 251 of each cable 253 attached to the projecting end of a piston rod 255, projecting from one end 257 of a hydraulic tensioning cylinder 259. The casing 261 of the cylinder is attached to the carriage of the delimber, the cylinder 259 aligned with the cable 253. The hydraulic cylinder 259 is pressurized through a line 263 to push a piston 265 from which the rod 255 projects, toward the other end 267 of the casing 261 to maintain the cable 253 properly tensioned.

Leakage may occur from the cylinder and/or the cable can become stretched. Means are provided for hydraulically accessing the cylinder to ensure that it remains pressurized to the required value to keep the cable properly tensioned. Preferably, the cylinder 259 is connected to a hydraulic circuit in the delimber that services another component of the delimber. A suitable hydraulic circuit could be the circuit 271 servicing the topping knives 273 on the boom. Each time the hydraulic circuit 271 servicing these knives is actuated, the cylinder 259 is also actuated, through the line 263 connecting it to the circuit 271, to tighten the cable. A pressure reducing valve 273 in the line 263 reduces the pressure from the hydraulic circuit 271, which could be 3000 psi, to a value required to maintain the desired tension in the cable. This pressure could be 700 psi. A one-way valve 275 in the line 263 maintains the pressure in the cylinder 259 when the circuit 271 to the topping knives is closed. Thus the tension is automatically maintained in the cable through the hydraulic tensioner every time the component of the delimber, using the selected hydraulic circuit, is operated.

If desired, the tension could be controlled manually, through a solenoid valve 277, controlled by the operator of the delimber. The solenoid valve 277, provided in the line 263, can be actuated intermittently by the operator when the circuit 271 is in use.

The hydraulic tensioner has been described in conjunction with the modular delimber employing single or double cable drives. It could also be used with any delimbers employing single or more cable drives which require the cable or cables to maintained at a specific tension and which delimbers are not modular.

What is claimed is:

1. A delimber having a base; a carriage mounted on the base; a boom slidably mounted through the carriage; boom drive means mounted on the carriage; drive transfer means connected between the boom drive means and the boom; the boom drive means having a variable displacement hydraulic motor and a gear box connecting the motor to the drive transfer means.

2. A delimber as claimed in claim 1 wherein the motor is connected to a pressure source on the delimber through a first pressure control valve to have the motor, operating at a first pressure, move the boom in a manner to move a tree to the carriage; a second pressure control valve; and switch means selectively connecting the second pressure control valve in series with the first pressure control valve to increase the operating pressure of the motor to a second pressure to more easily move a heavier tree.

3. A tree delimber as claimed in claim 2 wherein the switch means is of the type for automatically maintaining the connection of the second pressure control valve to the first pressure control valve for a short predetermined period of time.

4. A delimber as claimed in claim 1 wherein the motor is selectively connected to a pressure source on the delimber through first or second pressure control valves to have the motor, operating at a first pressure, move the boom in either direction, one of the directions being a direction to delimb a tree held by the carriage.

5. A delimber as claimed in claim 4 including a third pressure control valve, and switch means selectively connecting the third pressure control valve in series with one of the first and second pressure control valves to increase the operating pressure of the motor to a second pressure to more easily move a heavier tree.

6. A delimber as claimed in claim 4 wherein the first pressure control valve moves the boom in the direction to delimb the tree; a third pressure control valve; and switch means selectively connecting the third pressure control valve in series with the second pressure control valve to increase the operating pressure of the motor to a second pressure to more easily move a heavier tree.

7. A delimber as claimed in claim 5 wherein the switch means is of the type for automatically maintaining the connection of the third pressure control valve to the first or second pressure control valve for a predetermined period of time.

8. A delimber as claimed in claim 6 wherein the switch means is of the type for automatically maintaining the connection of the third pressure control valve to the second pressure control valve for a predetermined period of time.

* * * * *

UNITED STATES PATENT AND TRADEMARK OFFICE
CERTIFICATE OF CORRECTION

PATENT : 6,125,895
DATED : October 3, 2000
INVENTOR(S) : Martin Camirand et al

It is certified that error appears in the above-identified patent and that said Letters Patent is hereby corrected as shown below:

On the title page, before item [56] References Cited insert the following:
--[30] Foreign Application Priority Data
Jul. 31, 1998 [CA] Canada ............2244443--.

Signed and Sealed this

Twenty-seventh Day of March, 2001

Attest:

NICHOLAS P. GODICI

Attesting Officer

Acting Director of the United States Patent and Trademark Office